United States Patent
Kern et al.

(10) Patent No.: US 8,694,714 B2
(45) Date of Patent: Apr. 8, 2014

(54) RETARGETING OF A WRITE OPERATION RETRY IN THE EVENT OF A WRITE OPERATION FAILURE

(75) Inventors: William Kern, Palo Alto, CA (US); Peter Chan, Santa Clara, CA (US)

(73) Assignee: Spansion LLC, Sunnyvale, CA (US)

( * ) Notice: Subject to any disclaimer, the term of this patent is extended or adjusted under 35 U.S.C. 154(b) by 710 days.

(21) Appl. No.: 12/016,674

(22) Filed: Jan. 18, 2008

(65) Prior Publication Data

US 2009/0187700 A1 Jul. 23, 2009

(51) Int. Cl.
| | |
|---|---|
| G06F 12/00 | (2006.01) |
| G06F 13/00 | (2006.01) |
| G06F 13/28 | (2006.01) |
| G06F 3/00 | (2006.01) |
| G06F 5/00 | (2006.01) |
| G06F 11/00 | (2006.01) |
| G11C 11/34 | (2006.01) |
| G11C 16/06 | (2006.01) |
| G11C 16/04 | (2006.01) |

(52) U.S. Cl.
USPC ...... 711/103; 711/100; 711/162; 365/185.09; 365/185.33; 714/6.32; 714/100; 714/2; 714/6.1; 710/52

(58) Field of Classification Search
None
See application file for complete search history.

(56) References Cited

U.S. PATENT DOCUMENTS

| | | | | |
|---|---|---|---|---|
| 6,601,132 B2 * | 7/2003 | Nomura et al. | | 711/103 |
| 6,691,205 B2 * | 2/2004 | Zilberman | | 711/103 |
| 7,477,477 B2 * | 1/2009 | Maruchi et al. | | 360/78.08 |
| 8,041,879 B2 * | 10/2011 | Erez | | 711/103 |
| 2002/0191459 A1 * | 12/2002 | Tsujikawa et al. | | 365/200 |
| 2004/0177054 A1 * | 9/2004 | Stern et al. | | 707/1 |
| 2006/0198202 A1 * | 9/2006 | Erez | | 365/185.29 |
| 2010/0106893 A1 * | 4/2010 | Fasoli et al. | | 711/103 |

OTHER PUBLICATIONS

Samsung memory K9K2G08U0A datasheet 35 pages Oct. 25, 2004.*

* cited by examiner

*Primary Examiner* — Sanjiv Shah
*Assistant Examiner* — Marwan Ayash
(74) *Attorney, Agent, or Firm* — Amin, Turocy & Watson, LLP

(57) ABSTRACT

Methods and systems are herein disclosed for write operation retry using the data stored and retained in an internal buffer within the non-volatile memory device. By using the data stored in the internal buffer, the systems and method of the present invention eliminate the need to include a dedicated retry buffer at the system level. Thereby, reducing the system cost, minimizing space consumption on a board within the system and, in some instance, limiting the latency attributed to a retry that relies on retrying the write based on re-transferring of the data contents to the internal non-volatile memory buffer.

21 Claims, 9 Drawing Sheets

RETARGETING OF A WRITE OPERATION RETRY IN THE EVENT OF A WRITE OPERATION FAILURE

TECHNICAL FIELD

The subject innovation relates generally to memory systems and in particular to systems and methods for retargeting of a write operation retry in the event of a write operation failure.

BACKGROUND

A wide variety of memory devices can be used to maintain and store data and instructions for various computers and similar systems. In particular, flash memory is a type of electronic memory media that can be rewritten and that can retain content without consumption of power. Unlike dynamic random access memory (DRAM) devices and static random memory (SRAM) devices in which a single byte can be erased, flash memory devices are typically erased in fixed multi-bit blocks or sectors. Flash memory technology can include NOR flash memory and/or NAND flash memory, for example. NOR flash memory evolved from electrically erasable read only memory (EEPROM) chip technology, in which, unlike flash memory, a single byte can be erased; and NAND flash memory evolved from DRAM technology. Flash memory devices typically are less expensive and denser as compared to many other memory devices, meaning that flash memory devices can store more data per unit area.

Flash memory has become popular, at least in part, because it combines the advantages of the high density and low cost of EPROM with the electrical erasability of EEPROM. Flash memory is non-volatile; it can be rewritten and can hold its content without power. It can be used in many portable electronic products, such as cell phones, portable computers, voice recorders, thumbnail drives and the like, as well as in many larger electronic systems, such as cars, planes, industrial control systems, etc. The fact that flash memory can be rewritten, as well as its retention of data without a power source, small size, and light weight, have all combined to make flash memory devices useful and popular means for transporting and maintaining data.

When a write operation is successfully completed to a block-addressable non-volatile memory, such as a NAND flash memory device or the like, a signal indicating the result of the write operation is asserted or the status may be otherwise read from the non-volatile memory device. When the information asserts that the operation was successful the next step for the system is to process the next pending operation or for the system to go idle if no further processing is required. However, when the information asserts that the write operation was unsuccessful the next step in a robust system is to try to write the data to another location provided that the original data to be written is still available to the system. The process of attempting to write the data to another location after an unsuccessful write operation is commonly referred to as a retry. In conventional systems, a retry is accomplished in the same manner of the original write operation, the data associated with write is transferred from a system buffer to a buffer within the non-volatile device.

Thus, in order to have the original data available, i.e. stored in a system buffer, after an unsuccessful write operation requires a dedicated amount of buffering in the system design. However, there is a cost associated with the memory device used by the system to provide the buffering. In addition to the cost, by accounting for a memory device to support the dedicated system buffer, more space is utilized at the board level, which impedes the goal of trying to minimize board space consumption. Board design is especially of concern when the system is a compact portable device, such as a cellular telephone, personal data assistant (PDA) or the like.

In addition to the cost related to the dedicated buffer device and the board design considerations there is a latency attributed to the current retry process associated with re-transferring the original data from the system buffer to the buffer in the non-volatile device.

Thus, a need exists to develop a novel approach for retrying non-volatile write operations. The desired approach should provide for a retry method without relying on an external system buffer. As such, by eliminating the need for the external system buffer, overall cost of the system is minimized, space minimization in terms of board design can be addressed and latencies attributed to transferring the data from the external system buffer to the non-volatile device buffer can be eliminated.

SUMMARY

The following presents a simplified summary of the innovation in order to provide a basic understanding of some aspects described herein. This summary is not an extensive overview of the disclosed subject matter. It is intended to neither identify key or critical elements of the disclosed subject matter nor delineate the scope of the subject innovation. Its sole purpose is to present some concepts of the disclosed subject matter in a simplified form as a prelude to the more detailed description that is presented later.

The disclosed subject matter relates to systems and/or methods for write operation retry in a non-volatile memory. The disclosed innovations provide for the write operation retry to be attempted using the data retained in an internal buffer within the non-volatile memory device to which the write operation is directed. By using the data retained in the internal buffer, the system and method of the present invention eliminates the need to include a dedicated retry buffer at the system level. Thereby, reducing the system cost, minimizing space consumption on a board within the system and, in some instances, limiting the latency attributed to a retry that relies on retrying the write based on re-transferring of the data contents to the internal non-volatile memory buffer.

In one aspect of the innovation, notification of the write operation failure will trigger the system to issue a retarget address, i.e., a new physical address/location to the buffer of the non-volatile device and the device will attempt to write the data to the location within the non-volatile device associated with the retarget address. In another aspect, of the innovation, notification of the write operation failure will trigger the system to transfer the data from the buffer of the non-volatile memory device to a second non-volatile memory device and the data will be attempted to be written to the second non-volatile memory device.

According to one aspect of the present innovation, a memory system for providing non-volatile write operation retry is defined. The memory system includes a first non-volatile memory device including a buffer that retains data associated with a failed write operation. The system additionally includes a volatile memory in communication with the first non-volatile memory device that includes write operation retry logic. The write operation retry logic is operable to receive notice of the write operation failure from the first non-volatile memory device and attempt a first write operation retry using the data retained in the buffer.

According to one aspect of the system, the write operation retry logic is further operable to provide a retarget address to the first non-volatile memory device. In turn, the first non-volatile memory device attempts to write the data from the first buffer to the retarget address.

According to another aspect of the system, the write operation retry logic is further operable to transfer the data in the buffer to a second non-volatile memory device. For example, the write operation retry logic may be operable to issue a read command to the first non-volatile memory device and issue a write command to the second non-volatile device.

A further aspect of the system provides for the write operation retry logic to be operable to attempt a second write operation retry, if the first write operation retry fails. In one example, the first write operation retry may be operable to provide a retarget address to the first non-volatile memory device, such that the first non-volatile memory device attempts to write the data in the buffer to the retarget address and the second write operation retry may be operable to transfer the data in the buffer to a second non-volatile memory device. In another example, the first write operation retry may be operable to transfer the data in the buffer to a second non-volatile memory device and the second write operation retry may be operable to provide a retarget address to the first non-volatile memory device, such that the first non-volatile memory device attempts to write the data in the buffer to the retarget address.

In a further aspect of the system, the write operation logic may be operable to logically determine, based on existing conditions or the like, which write operation retry process to use from amongst a first retry process that includes providing a retarget address to the first non-volatile memory device, such that the first non-volatile memory device attempts to write the data in the first buffer to the retarget address or a second retry that includes transferring the data to the a second non-volatile device.

A further aspect of the invention is defined by an electronic device that includes a memory system for providing non-volatile write operation retry. The memory system includes a first non-volatile memory device including a buffer that retains data associated with a failed write operation. The system additionally includes a volatile memory in communication with the first non-volatile memory device that includes write operation retry logic. The write operation retry logic is operable to receive notice of the write operation failure from the first non-volatile memory device and attempt a first write operation retry using the data retained in the buffer.

The electronic device may include, but is not limited to, one of a computer, a cellular phone, a digital phone, a video device, a smart card, a personal digital assistant, a television, an electronic game, a digital camera, an electronic organizer, an audio player, an audio recorder, an electronic device associated with digital rights management, a Personal Computer Memory Card International Association (PCMCIA) card, a trusted platform module (TPM), an electronic control unit associated with a motor vehicle, a global positioning satellite (GPS) device, an electronic device associated with an airplane, an electronic device associated with an industrial control system, a Hardware Security Module (HSM), a set-top box, a secure memory device with computational capabilities, or an electronic device with at least one tamper-resistant chip.

A further aspect of the present innovation is defined by a method for non-volatile write operation retry in a computing system. The method includes receiving notice of a write operation failure in a first non-volatile memory device and attempting a first write operation retry using data retained in a buffer of the first non-volatile memory device.

In one aspect of the method, attempting a first write operation retry may include providing a retarget address to the first non-volatile memory device, such that the first non-volatile memory device attempts to write the data in the buffer to the retarget address.

In another aspect of the method, attempting a first write operation retry may include transferring the data in the buffer to a second non-volatile memory device. For example, transferring the data in the buffer to a second non-volatile memory may include issuing a read command to the first non-volatile memory device and issuing a write command to the second non-volatile device.

In alternate aspects of the method, the method may additionally include attempting a second write operation retry based on data stored in the internal buffer of the first non-volatile memory device, if the first write operation retry is unsuccessful. In such aspects, the first write operation retry may provide a retarget address to the first non-volatile memory device, such that the first non-volatile memory device attempts to write the data in the buffer to the retarget address and the second write operation retry may include transferring the data in the buffer to a second non-volatile memory device. In other aspects, the first write operation retry may include transferring the data in the buffer to a second non-volatile memory device and the second write operation retry may include providing a retarget address to the first non-volatile memory device, such that the first non-volatile memory device attempts to write the data in the buffer to the retarget address.

In a still further aspect of the method, attempting a first write operation retry may further include logically determining, based on existing conditions or the like, which write operation retry process to use from amongst a first retry process that includes providing a retarget address to the first non-volatile memory device, such that the first non-volatile memory device attempts to write the data in the first buffer to the retarget address or a second retry that includes transferring the data to the a second non-volatile device.

As such, the present innovation provides methods and systems for write operation retry to be attempted using the data retained in an internal buffer within the non-volatile memory device. By using the data retained in the internal buffer, the systems and method of the present invention eliminate the need to include a dedicated retry buffer at the system level. Thereby, reducing the system cost, minimizing space consumption on a board within the system and, in some instance, limiting the latency attributed to a retry that relies on retrying the write based on re-transferring of the data contents to the internal non-volatile memory buffer.

The following description and the annexed drawings set forth in detail certain illustrative aspects of the disclosed subject matter. These aspects are indicative, however, of but a few of the various ways in which the principles of the innovation may be employed and the disclosed subject matter is intended to include all such aspects and their equivalents. Other advantages and distinctive features of the disclosed subject matter will become apparent from the following detailed description of the innovation when considered in conjunction with the drawings.

DETAILED DESCRIPTION

Figure 1:
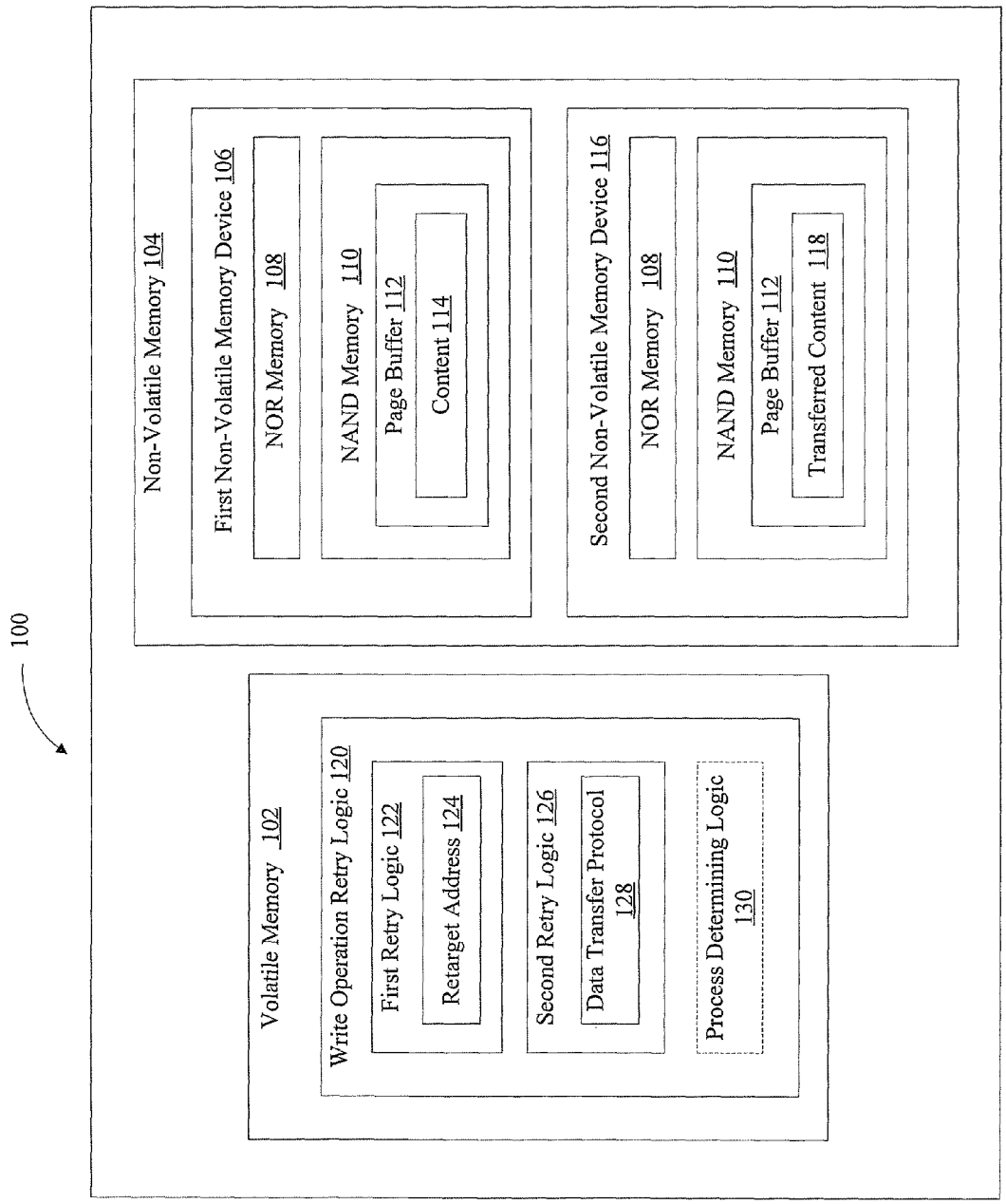
FIG. 1 illustrates a block diagram of a computing system for write operation retry using data retained in a non-volatile buffer, in accordance with an aspect of the subject matter disclosed herein.

The disclosed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the disclosed subject matter may be practiced without these specific details. In other instances, well-known structures and devices are shown in block diagram form in order to facilitate describing the subject innovation.

The disclosed subject matter relates to systems and/or methods for write operation retry in a non-volatile memory device. The disclosed innovations provide for the write operation retry to be attempted using the data retained in an internal buffer within the non-volatile memory device. By using the data retained in the internal buffer, the system and method of the present invention eliminates the need to include a dedicated retry buffer at the system level. Thereby, reducing the system cost, minimizing space consumption on a board within the system and, in some instances, limiting the latency attributed to a retry that relies on retrying the write based on re-transferring of the data contents to the internal non-volatile memory buffer.

Present innovations attempt the write operation retry using the retained data in the internal buffer in one of two manners. In a first aspect of the innovation, the system will issue a retarget address, i.e., a new physical address/location, to the data in the internal buffer and the non-volatile memory will attempt to write the data to the new location. In a second aspect of the innovation, the system will transfer the data from the internal buffer of the non-volatile device to a second non-volatile memory device and a subsequent attempt will be made to write the data to the second non-volatile memory device.

Turning to the figures, FIG. 1 illustrates a high-level block diagram depiction of system 100 for write operation retry using data retained in an internal buffer within a non-volatile memory device. The system 100 includes volatile memory 102 and non-volatile memory 104. The non-volatile memory may include, but is not limited to, read-only memory (ROM), flash memory (e.g., single-level cell flash memory, multi-level cell flash memory), mask-programmed ROM, programmable ROM (PROM), Erasable PROM (EPROM), Ultra Violet (UV)-erase EPROM, one-time programmable ROM, electrically erasable PROM (EEPROM), and/or non-volatile RAM (e.g., ferroelectric RAM (FeRAM)). The volatile memory may include, but is not limited to, RAM, static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

The non-volatile memory 104 includes a first non-volatile memory device 106, which may be configured to include both NOR type memory 108 and NAND type memory 110. In the illustrated aspect of FIG. 1, the NAND type memory 110 includes a buffer, such as page buffer 112. The page buffer 112 is configured to retain content 114 after an unsuccessful write operation attempt. While conventional page buffers will generally release the content after a write operation, in accordance with the present innovation, the buffer is configured to retain the information after the write operation for the purpose of making the content accessible to the system for a subsequent write operation retry.

According to one aspect of the innovation, the non-volatile memory 104 may include one or more second non-volatile memory devices 116, which may be configured to include both NOR type memory 108 and NAND type memory 110. In the illustrated aspect of FIG. 1, the NAND memory 110 includes a buffer, such as page buffer 112. The page buffer includes transferred content 118, which signifies content 114 having been transferred from the first non-volatile memory device 106 to the second non-volatile memory device 116 for the purpose of executing a write operation retry option, according to present aspects of the innovation. It should be noted that in those aspects of the innovation in which a data transfer option is not afforded by the write operation retry process, the system 100 may not include second non-volatile memory devices 116.

The volatile memory 102 of system 100 includes write operation retry logic 120 operable for attempting write operation retry using the content 114 retained in the buffer 112 of the first non-volatile memory device, i.e. the device to which the original write operation was attempted. It should be noted that the use of the term "logic" may include any hardware component, software component, firmware component or any combination thereof, which is operable to perform the procedures, operations and methodologies herein described.

In one aspect of the present innovation, the write operation retry logic 120 includes first retry logic 122 operable to issue a retarget address 124, i.e., a new physical address/location within the first non-volatile memory device 106, and a write operation command associated with the retarget address 124. As such, upon receiving the retarget address 124 and the write operation command, the first non-volatile memory device 106 will attempt to write the content 114 from buffer 112 to the location associated with the retarget address 124.

In another aspect of the present innovation, the write operation retry logic 120 may include second retry logic 126 operable to transfer the content 114 from the buffer 112 of the first non-volatile memory device 106 to a buffer 112 within a second non-volatile memory device 116. The transfer of content 114 from the first non-volatile memory device 106 to the second non-volatile memory device 116 may be accomplished using data transfer protocol 128. In certain aspects the data transfer protocol 128 may be operable to issue a read command to the buffer 112 of the first non-volatile memory device 106 and, subsequently, a write command to the buffer 112 of the second non-volatile memory device 116. In some aspects, transfer from the first non-volatile memory 106 to the second non-volatile memory 116 may be direct, while in other aspects; temporary storage at the system level may be required to facilitate the transfer.

In certain aspects, the write operation retry logic may be configured to attempt a second or more write operation retry in the event that the first or subsequent write operation retry fails. In such aspects, the second or subsequent write operation retry may be the same retry process originally or previously attempted or the second or subsequent process may be a different retry process that was originally or previously attempted. For example, in one aspect a first write operation retry may include execution of the first retry logic 122 and the second write operation retry may include execution of the second retry logic 126. In another example, a first write operation retry may include execution of the second retry logic 126 and the second write operation retry may include execution of the first retry logic 122. The number of write operation retry attempts and the process used to make an attempt are configurable and independent of one another.

In one optional aspect of the innovation, the write operation retry logic 120 may include process determining logic 130 operable to logically determine, from existing conditions or the like, which of the two or more retry processes to attempt. For example, in one aspect the process determining logic may be configured to choose between the first retry logic 122 and the second retry logic 126. Existing conditions may include, but are not limited to, the availability of second non-volatile memory device(s) 116, the state of the first non-volatile memory device 106, the state of accessible second non-volatile memory devices 108 and the like.

Figure 2:
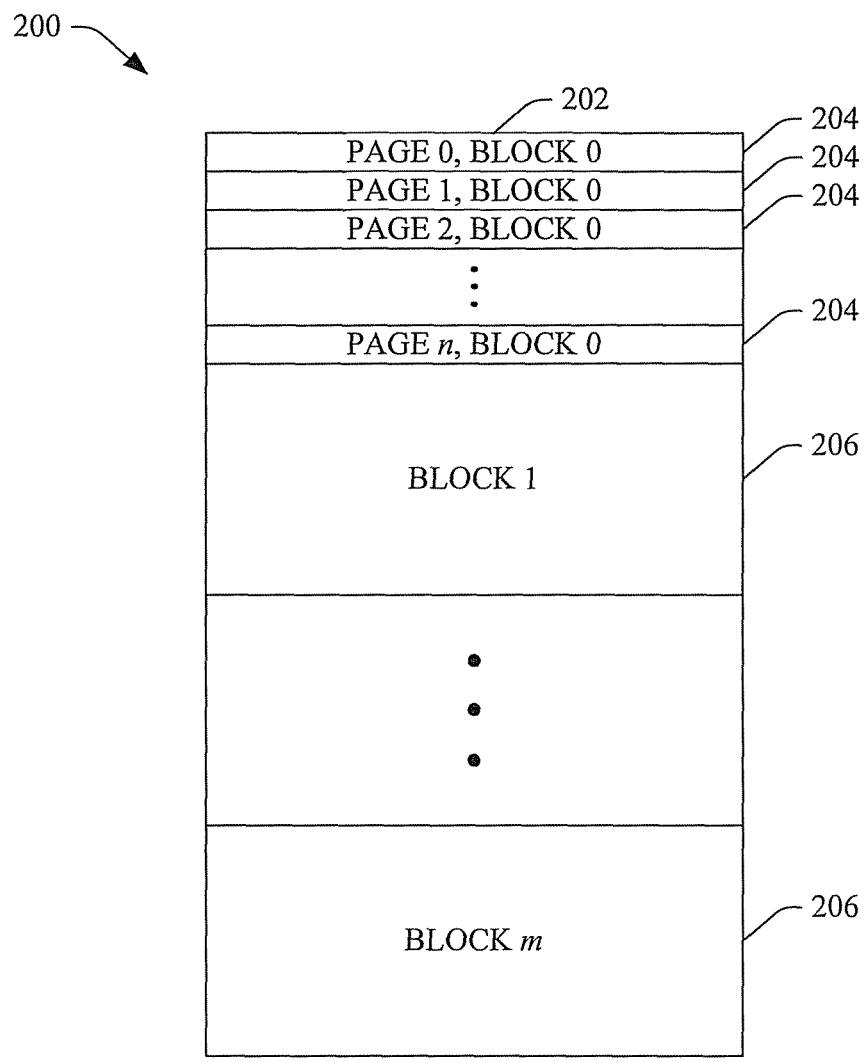
FIG. 2 depicts an example of a block diagram of a portion of a memory component, in accordance with an aspect of the disclosed subject matter.

Turning to FIG. 2, depicted is a block diagram of a portion of a non-volatile memory 200 (e.g., single-level cell flash memory, multi-level cell flash memory that can include a buffer, such as a page buffer, suitable for retaining content data after a write operation failure, in accordance with an aspect of the disclosed subject matter. The memory 200 can be comprised of a memory array 202 that can contain a plurality of pages 204 that can be comprised of and/or associated with memory cells (not shown) in which data can be stored. Each page 204 can store a predetermined number of bits of data. Each page 204 can include a portion of the page 204 that can store data, such as user data, and a portion of the page 204 can store spare data, such as metadata, wherein, for example, the required data store integrity check, such as an Error Correction Code (ECC).

The memory array 202 can also contain a predetermined number of blocks 206 wherein each block 206 can contain a predetermined number of pages 204. For example, in one embodiment, there can be 512 pages 204 per block 206. In one aspect, the memory 200 can be a respective portion of, can be the same or similar as, and/or can include the same or similar functionality as the memory components shown in FIG. 1.

Figure 3A:
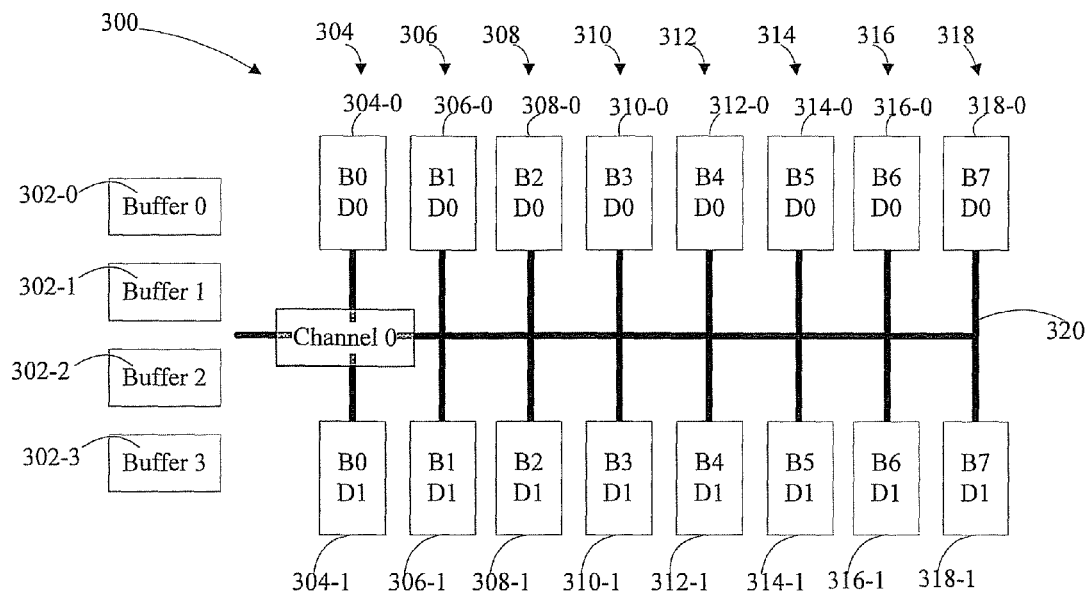
FIG. 3A depicts a block diagram of a conventional system architecture in which a system buffer stores the data to be used in a write operation retry, in accordance with the prior art

Referring to FIG. 3A, illustrated is a block diagram depicting a conventional system 300 architecture in which a system buffer stores the data to be used in a write operation retry, in accordance with the prior art. The system includes a set of buffers; Buffer 0 302-0, Buffer 1 302-1, Buffer 2 302-2, and Buffer 3 302-3 which are in communication with seven banks 304-318 of non-volatile memory devices through channel 0 communication bus 320. Thus, bank 0 304 includes non-volatile memory device 304-0 and 304-1, bank 1 306 includes non-volatile memory device 306-0 and 306-1, bank 2 308 includes non-volatile memory device 308-0 and 308-1, bank 3 310 includes non-volatile memory device 310-0 and 310-1, bank 4 312 includes non-volatile memory device 312-0 and 312-1, bank 5 314 includes non-volatile memory device 314-0 and 314-1, bank 6 316 includes non-volatile memory device 316-0 and 316-1, and bank 7 318 includes, non-volatile memory device 318-0 and 318-1. In accordance with the prior art, the data to be written during the write operation retry resides in one of the system buffers, which issues a write command to communicate and write the data to one of the non-volatile devices within the banks of devices.

Figure 3B:
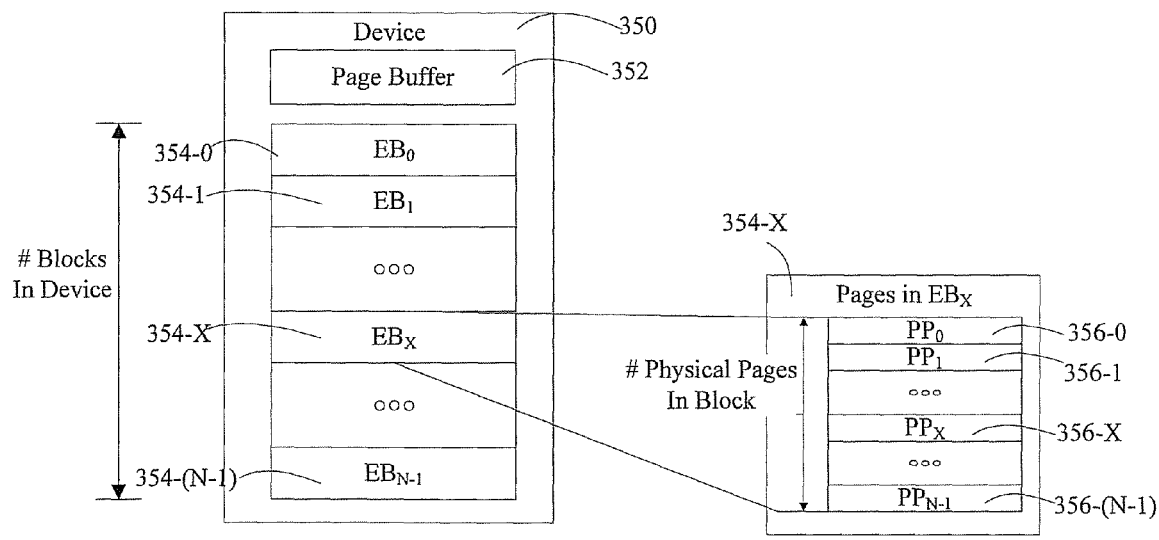
FIG. 3B depicts a block diagram of a non-volatile memory device including a page buffer suitable for retaining failed write operation data, in accordance with an aspect of the disclosed subject matter.

Turning to FIG. 3B, illustrated is a block diagram depicting non-volatile device 350 including a page buffer configured to retain data after a write operation and make the data available for a subsequent write operation retry, according to aspects of the present innovation. The non-volatile device 350 includes multiple blocks with each block including multiple physical pages. For example, the illustrated non-volatile device 350 includes block $EB_0$ 354-0, $EB_1$ 354-1, $EB_X$ 354-X and $EB_{N-1}$ 354-(N−1), where (N−1) indicates the total number of blocks in the device and X equals a random number between 0 and (N−1). Block $EB_X$ 354-X is emphasized to show the physical pages within the block, specifically page $PP_0$ 356-0, $PP_1$ 356-1, $PP_X$ 356-X and $PP_{N-1}$ 356-(N−1), where (N−1) indicates the total number of pages in the block and X equals a random number between 0 and (N−1). The page buffer 352 is configured such that retains the data to be written to an associated page within a block after a write operation has been attempted and failed. Retention of the data in the page buffer and the ability to have the system access the buffer to attempt the write operation retry are necessary in order to use the page buffer as the source for the data used in the write operation retry process. While the device shown in FIG. 3B includes one page buffer 352, the number of page buffers in a device may be dependent on the functional requirements and therefore, non-volatile devices with multiple page buffers are contemplated and within the scope of present innovations.

Figure 4:
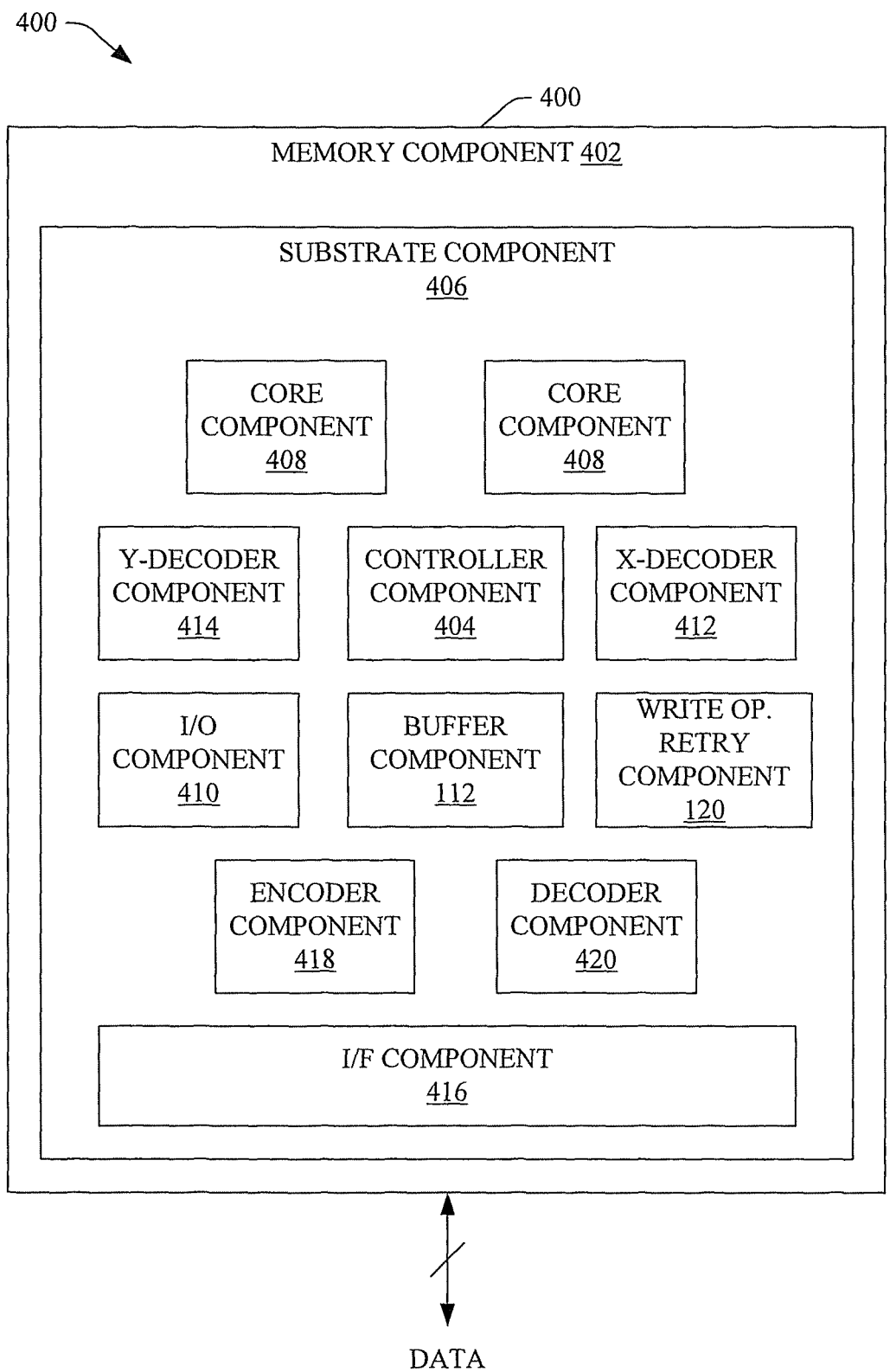
FIG. 4 depicts a block diagram of a system that can facilitate storage and transfer of data in accordance with an aspect of the disclosed subject matter.
Figure 5:
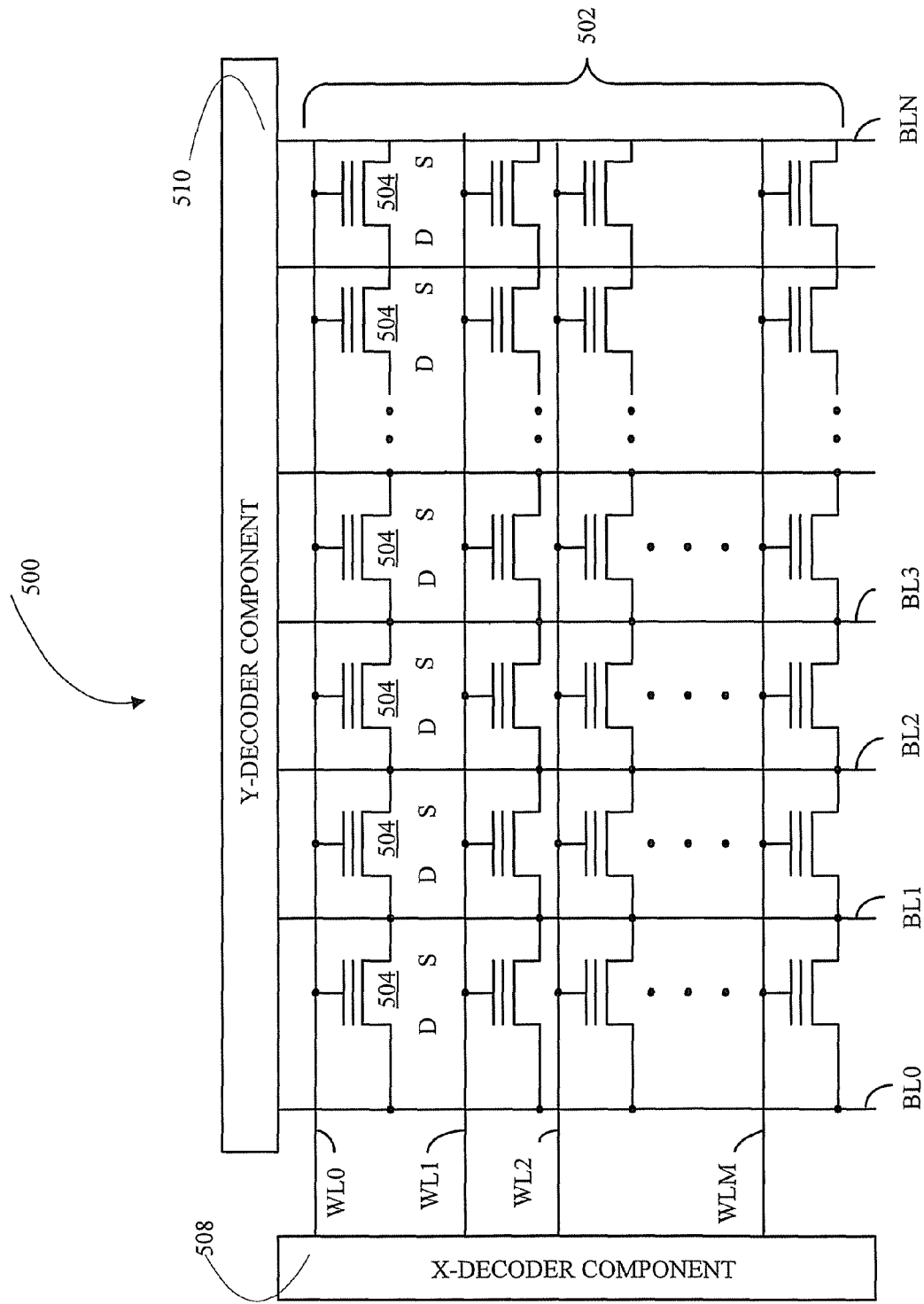
FIG. 5 illustrates a diagram of a portion of a memory array that can facilitate data storage, in accordance with an aspect of the disclosed subject matter.

Referring to FIG. 4, depicted is a block diagram of a system 400 that can facilitate access of data in a memory in accordance with an aspect of the disclosed subject matter. System 400 can include a memory component 402 that can be comprised of a non-volatile memory (e.g., single-level cell flash memory, multi-level cell flash memory) and/or volatile memory (e.g., SRAM). For example, the memory component 402 can comprise NOR flash memory and/or NAND flash memory. The memory component 402 can include a memory array (e.g., as illustrated in FIG. 5, and described infra.) that can be comprised of a plurality of memory cells (e.g., as depicted in FIG. 5), which can be memory locations, wherein, for each memory cell, one or more bits of data can be stored, and from which stored data can be read.

The memory component 402 can comprise a controller component 404 that can control and/or manage the execution of operations, and/or control data flow, associated with the memory component 402. In one aspect, the memory component 402 can contain a write operation retry logic/component 120 that can store one or more commands to facilitate write operation retry in the memory component and data transfers associated with retries. The memory component 402 also can include a buffer component, such as page buffer component 112 that can store and retain content, such as content 114 (shown in FIG. 1). It is to be appreciated that the memory component 402, write operation retry component logic/component 120, controller component 404, and buffer component 112 each can be the same or similar as respective components, and/or can contain the same or similar functionality as respective components, as more fully described herein, for example, with regard to system 100.

In accordance with an aspect, the memory component 402, including write operation retry component logic/component 120, controller component 404, and buffer component 112, and other components described herein, for example, with regard to system 400 can be formed and/or contained on a substrate component 406 (e.g., semiconductor substrate). In another aspect, one or more core components 408 (e.g., high-density core regions) and one or more lower-density peripheral regions can be formed on the substrate component 406. The core component(s) 408 typically can include one or more M by N arrays of individually addressable, substantially identical single-level cell and/or multi-level cell memory cells (e.g., as illustrated in FIG. 5 and described herein). The lower-density peripheral regions can typically include an input/output component 410 (e.g., input/output (I/O) circuitry) and programming circuitry for selectively addressing the individual memory cells. The programming circuitry can be represented in part by and can include one or more x-decoder components 412 and one or more y-decoder components 414 that can cooperate with the I/O component 410 for selectively connecting a source (not shown), gate (not shown), and/or drain (not shown) of selected addressed memory cells to predetermined voltages or impedances to effect designated operations (e.g., programming, reading, verifying, erasing) on the respective memory cells, and deriving necessary voltages to effect such operations. For example, an x-decoder component 412 and a y-decoder component 414 can each receive address bus information, which can be provided as part of a command, and such information can be utilized to facilitate determining the desired memory cell(s) in the memory component 402.

The memory component 402 can receive information (e.g., data, commands, etc.) via an interface component 416 (also referred to herein as "I/F 416"), which can also be formed on substrate component 406. I/F 416 can include and/or provide various adapters, connectors, channels, communication paths, etc. to integrate the memory component 402 into virtually any operating and/or database system(s) and/or with one another system(s). In addition, I/F 416 can provide various adapters, connectors, channels, communication paths, etc., that can provide for interaction and/or communication with a processor component (not shown in FIG. 4), and/or any other component, data, and the like, associated with the system 400. In accordance with one aspect, the I/F 416 can be structured based in part on an Open NAND Flash Interface (ONFI) standard to facilitate communication of data.

The memory component 402 can also contain an encoder component 418 that can facilitate encoding data being programmed to the memory component 402, where the encoder component 418 also can be formed on the substrate component 406. For example, the encoder component 418 can facilitate converting a digital signal to an analog signal (e.g., current level) to facilitate programming data in the memory locations (e.g., memory cells) in the memory component 402.

The memory component 402 can further include a decoder component 420 that can facilitate decoding data being read from the memory component 402. The decoder component 420 can receive an analog signal associated with data, where the analog signal can be stored in the memory location in the memory array, and can facilitate converting the analog signal to a digital signal, so that such digital signal representing the read data can be provided to another component (e.g., a processor component) for further processing.

Turning to FIG. 5, depicted is an example diagram of a portion of a memory array 502 that can be employed to facilitate storage of data in a memory 500 in accordance with an aspect of the disclosed subject matter. The memory array 502 can include a plurality of memory cells 504 that each can be comprised of a drain (D), gate, and source (S). Each memory cell 504 can have one or more levels therein and can store one or more bits of data therein.

The memory array 502 can be associated with an x-decoder component 508 (e.g., Word Line WL decoder) and a y-decoder component 510 (e.g., Bit Line BL decoder) that can each respectively decode inputs/outputs during various operations (e.g., programming, reading, verifying, erasing) that can be performed on the memory cells 502. The x-decoder component 508 and y-decoder component 510 can each receive address bus information and/or other information, and can utilize such information to facilitate accessing or selecting the desired memory cell(s) (e.g., memory location(s)) associated with the command. The x-decoder component 508 and y-decoder component 510 each can be the same or similar to respective components, as more fully described herein, and can be included in a memory component with regard to system 100, etc.

The memory cells 504 can be formed in M rows and N columns. A common WL can be attached to the gate of each memory cell 504 in a row, such as word-lines WL0, WL1, WL2, through WLM. A common BL can be attached to each cell 504 in a column, such as bit-lines BL0, BL1, through BLN. A WL can contain, for example, 1024 elements forming multiple words and a sector can include, for example, 512 WLs to provide at least 512 k elements of memory. In accordance with an aspect of the disclosed subject matter, respective voltages can be applied to one or more cells 504 through the WLs and BLs to facilitate performing operations, such as program, read, erase, and the like.

In accordance with one embodiment of the disclosed subject matter, the memory components and/or other respective components can be situated or implemented on a single integrated-circuit chip. In accordance with another embodiment, the memory components and/or other respective components can be implemented on an application-specific integrated-circuit (ASIC) chip.

The aforementioned systems have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 6:
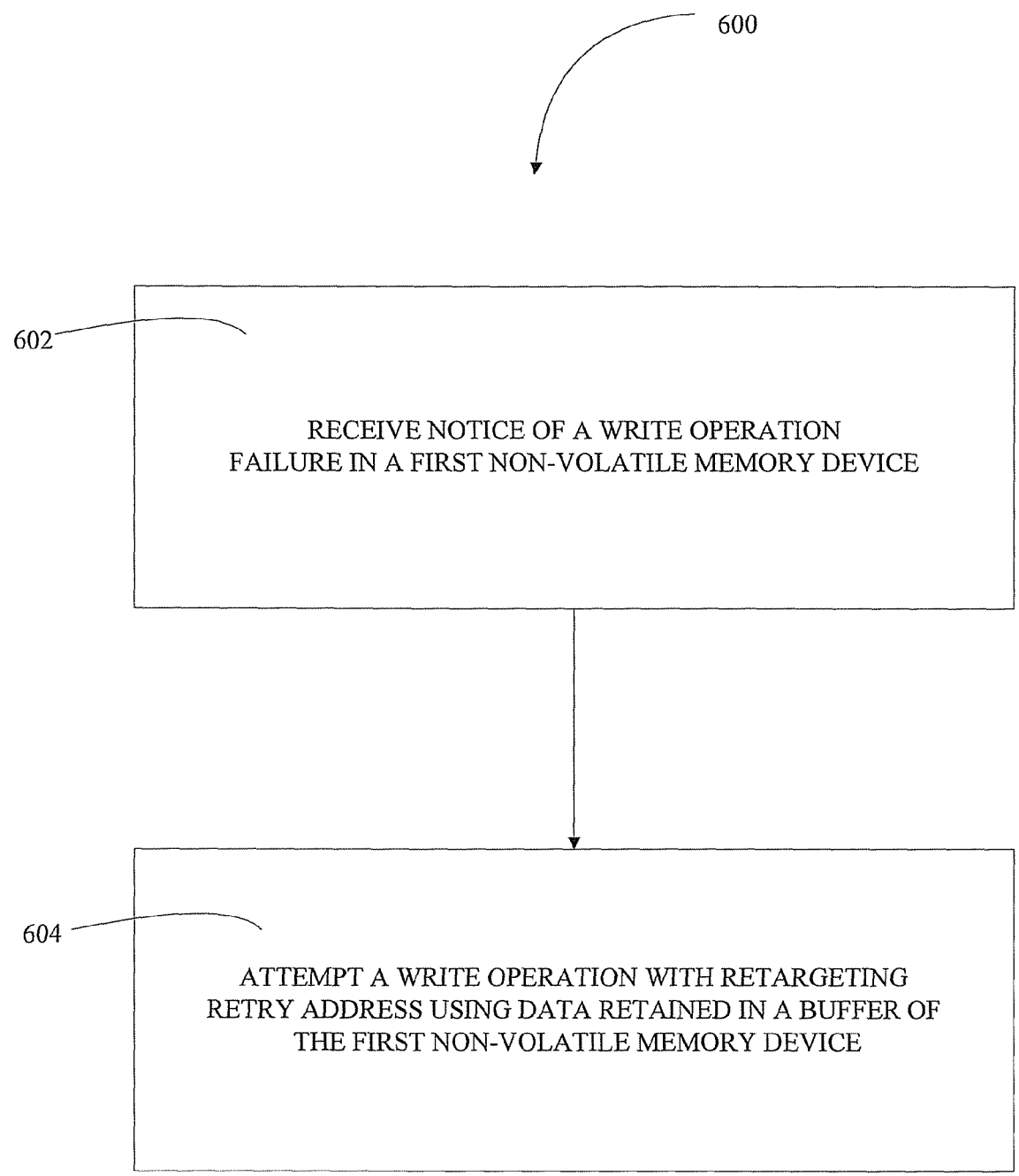
FIG. 6 illustrates a methodology for write operation retry using a retarget address, in accordance with an aspect of the subject matter disclosed herein.
Figure 7:
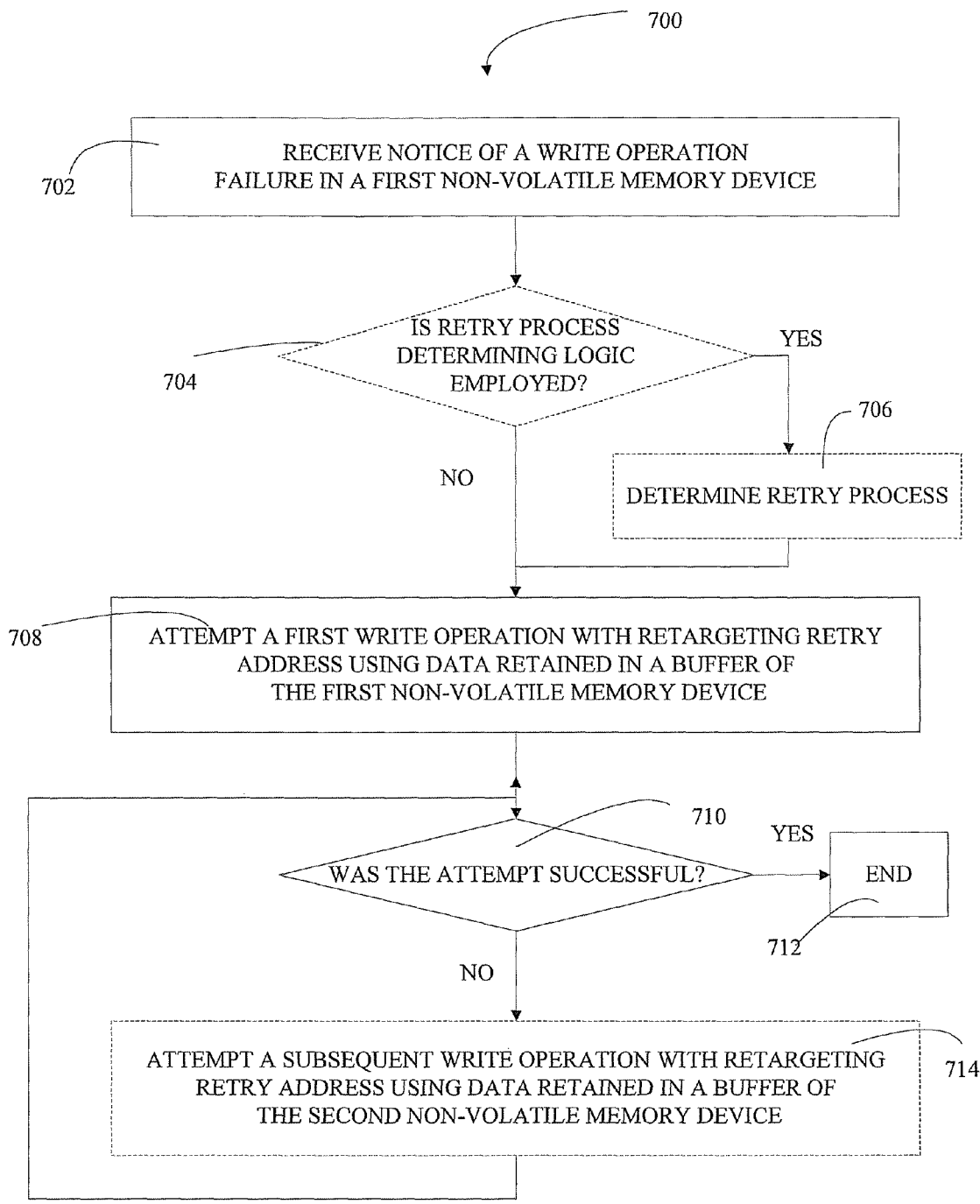
FIG. 7 illustrates a methodology for write operation retry using a transfer of the data from a buffer of a first non-volatile device to a second non-volatile device, according to another aspect of the subject matter herein disclosed.

FIGS. 6-7 illustrate methodologies and/or flow diagram in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodology could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring to FIG. 6, illustrated is a methodology 600 for write operation retry in a non-volatile memory device, according to aspects herein described. At Event 602, the system receives notification of a write operation failure occurring at a first non-volatile memory device. The system may receive a signal from the first non-volatile memory device asserting the unsuccessful write operation or the failure status may be read from the first non-volatile memory device.

At Event 604, in response to the write operation failure notification, the system attempts a write operation retry using the data retained in a buffer, such as a page buffer, of the first non-volatile memory device. As previously described, the buffer in the first non-volatile memory device is logically configured to retain the data for the purpose of allowing the system to access the data during subsequent retries.

In one aspect of the innovation, the write operation retry will include providing a retarget address, i.e., a different physical address/location within the first non-volatile memory device and issuing a write command for the new address. In another aspect of the innovation, the write operation retry will include transferring the data from the buffer of the first non-volatile memory device to a second non-volatile memory device and attempting to write the data to the second non-volatile memory device.

Turning to FIG. 7, illustrated is another methodology 700 for write operation retry in a non-volatile memory device, according to aspects herein described. At Event 702, the system receives notification of a write operation failure occurring at a first non-volatile memory device. The system may receive a signal from the first non-volatile memory device asserting the unsuccessful write operation or the failure status may be read from the first non-volatile memory device.

At optional Decision 704, a determination is made as to whether retry process determining logic is employed to logically determine which one of two or more retry logics will be used to attempt the write operation retry. Retry Process determining logic is not required if the system only executed one retry option or if the system is configured to execute a preconfigured sequential series of retry processes. In one aspect, the retry process determining logic may determine the retry process based on pre-existing conditions, such as second non-volatile memory device availability, the state of the first non-volatile memory device, that state of the second non-volatile memory device or the like. If the system does employ retry process determining logic the, at optional Event 706, a determination is made as to which retry process is to be executed.

If no retry process determining logic is employed or after a determination is made as to which retry process is to be executed, at Event 708, the system attempts a write operation retry using the data retained in a buffer, such as a page buffer, of the first non-volatile memory device. As previously described, the buffer in the first non-volatile memory device is logically configured to retain the data for the purpose of allowing the system to access the data during subsequent retries.

In one aspect of the innovation, the write operation retry will include providing a retarget address, i.e., a different physical address/location within the first non-volatile memory device and issuing a write command for the new address. In another aspect of the innovation, the write operation retry will include transferring the data from the buffer of the first non-volatile memory device to a second non-volatile memory device and attempting to write the data to the second non-volatile memory device.

At optional Event 710, a determination is made as to whether the write operation retry attempt was successful. If successful, at Event 712, the process is completed. If the write operation retry event was unsuccessful, at optional Event 714, the system may attempt a subsequent write operation retry. In such aspects, the subsequent write operation retry may be the same retry process originally or previously attempted or the second or subsequent process may be a different retry process that was originally or previously attempted. For example, in one aspect a first write operation retry may include execution of the first retry logic 122 and the second write operation retry may include execution of the second retry logic 126. In another example, a first write operation retry may include execution of the second retry logic 126 and the second write operation retry may include execution of the second retry logic 122. The number of write operation retry attempts and the process used to make an attempt are configurable and independent of one another.

It is to be appreciated and understood that the subject innovation is not limited by the acts illustrated and/or by the order of acts, as, for example, acts can occur in various orders and/or concurrently, and with other acts not presented and described herein. In one aspect, the memory component and the at least one other memory component can operate in parallel and/or an interleaved manner to service their respective subset of commands, such that each memory component can service its respective subset of commands at the same or substantially the same time as the other memory component(s) services its respective subset of commands to facilitate improved data storage and retrieval.

In accordance with one embodiment, the data transfers can be de-centralized, such that each memory component can contain its own transfer buffer component, which can receive and store data associated with its subset of commands. Each memory component can provide the data stored in its transfer buffer component when all commands in its queue have been serviced. The data can be received from the memory components by the transfer controller component, and the transfer controller component can place the received data in its proper order in its transfer buffer component based in part on the transfer map. The transfer controller component can then transmit the data to the processor component.

The subject innovation can facilitate improved memory storage and data retrieval, as compared to conventional systems, as each memory component can service data requests (e.g., commands in its queue) independent of the other memory components and/or can facilitate transferring the data to the transfer controller component, even when another memory component(s) has not finished servicing any or all of its respective subset of commands. At this point, methodology 600 and 700 can end.

Figure 8:
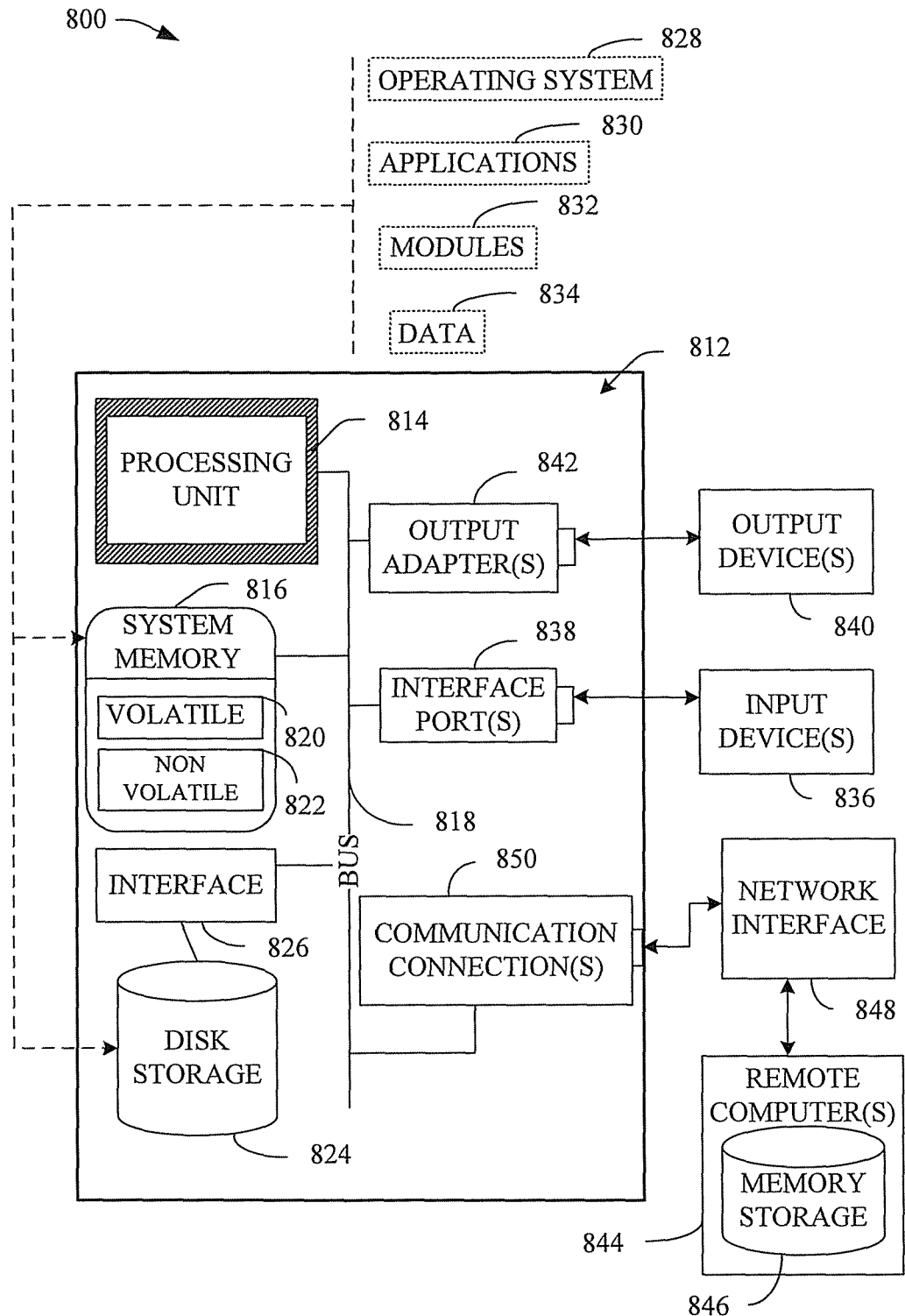
FIG. 8 illustrates a schematic block diagram illustrating a suitable operating environment.

With reference to FIG. 8, a suitable environment 800 for implementing various aspects of the claimed subject matter includes a computer 812. The computer 812 includes a processing unit 814, a system memory 816, and a system bus 818.

The system bus 818 couples system components including, but not limited to, the system memory 816 to the processing unit 814. The processing unit 814 can be any of various available processors. Dual microprocessors and other multiprocessor architectures also can be employed as the processing unit 814.

The system bus 818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 816 includes volatile memory 820 and non-volatile memory 822. The basic input/output system (BIOS), containing the basic routines to transfer information between elements within the computer 812, such as during start-up, is stored in non-volatile memory 822. In addition, according to present innovations, the first non-volatile memory device buffer that retains the data after the write operation failure and the second non-volatile memory device (not shown in FIG. 8) may be included within non-volatile memory 822. By way of illustration, and not limitation, non-volatile memory 822 can include read only memory (ROM), programmable ROM (PROM), electrically programmable ROM (EPROM), electrically erasable programmable ROM (EEPROM), or flash memory. Volatile memory 820 includes random access memory (RAM), which acts as external cache memory. According to present aspects, the volatile memory may store the write operation retry logic (not shown in FIG. 8) and the like. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 812 may also include removable/non-removable, volatile/non-volatile computer storage media. FIG. 8 illustrates, for example, a disk storage 824. Disk storage 824 includes, but is not limited to, devices like a magnetic disk drive, solid state disk (SSD) floppy disk drive, tape drive, Jaz drive, Zip drive, LS-100 drive, flash memory card, or memory stick. In addition, disk storage 824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 824 to the system bus 818, a removable or non-removable interface is typically used, such as interface 826.

It is to be appreciated that FIG. 8 describes software that acts as an intermediary between users and the basic computer resources described in the suitable operating environment 800. Such software includes an operating system 828. Operating system 828, which can be stored on disk storage 824, acts to control and allocate resources of the computer system 812. System applications 830 take advantage of the management of resources by operating system 828 through program modules 832, such as the write operation retry logic 120 (shown in FIG. 1) and the like, and program data 834, such as the boot/shutdown transaction table and the like, stored either in system memory 816 or on disk storage 824. It is to be appreciated that the claimed subject matter can be implemented with various operating systems or combinations of operating systems.

A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port may be used to provide input to computer 812, and to output information from computer 812 to an output device 840. Output adapter 842 is provided to illustrate that there are some output devices 840 like monitors, speakers, and printers, among other output devices 840, which require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a personal computer, a server, a router, a network PC, a workstation, a microprocessor based appliance, a peer device or other common network node and the like, and typically includes many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 850 refers to the hardware/software employed to connect the network interface 848 to the bus 818. While communication connection 850 is shown for illustrative clarity inside computer 812, it can also be external to computer 812. The hardware/software necessary for connection to the network interface 848 includes, for exemplary purposes only, internal and external technologies such as, modems including regular telephone grade modems, cable modems and DSL modems, ISDN adapters, and Ethernet cards.

Figure 9:
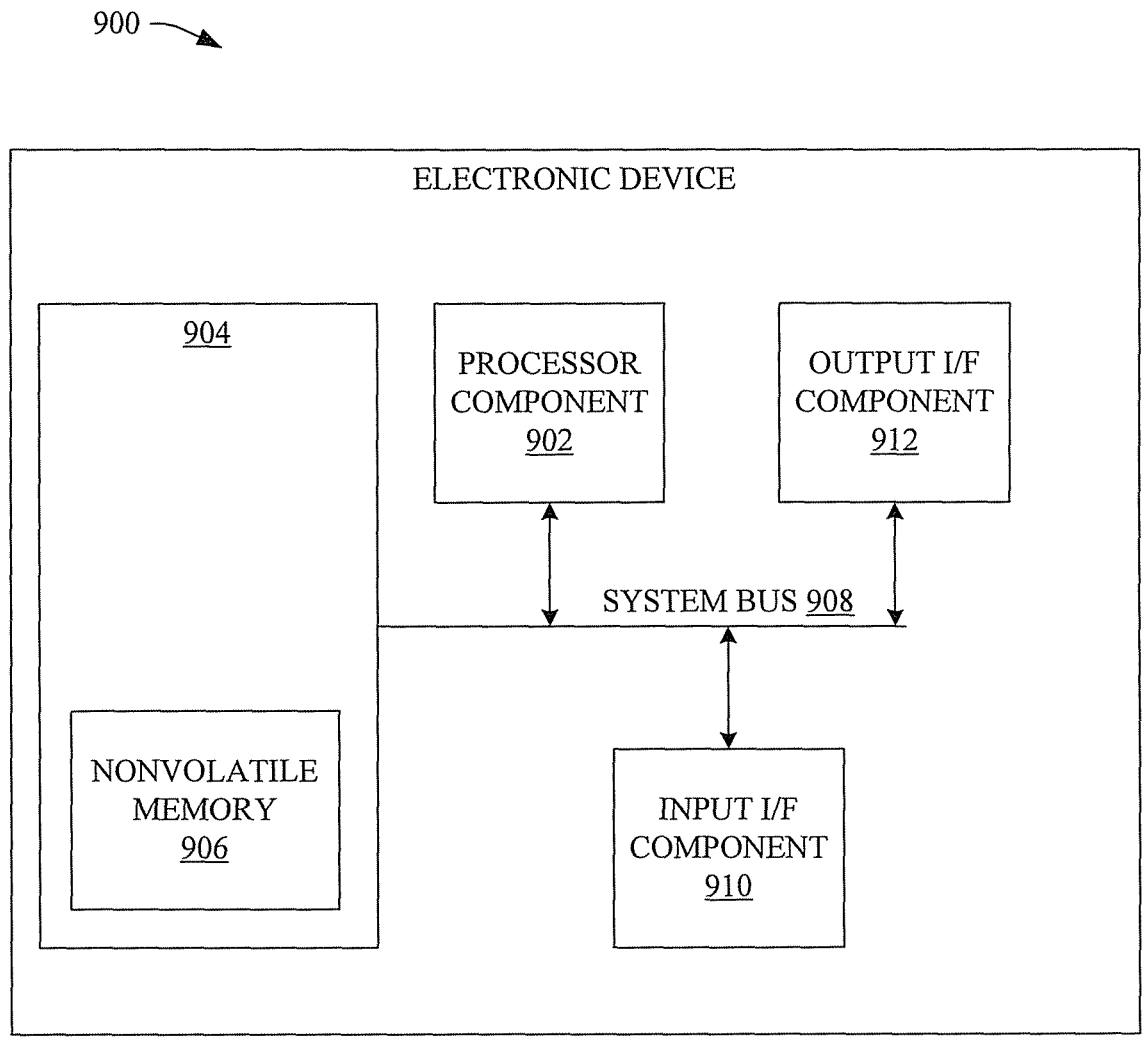
FIG. 9 illustrates an example of an electronic device that can be associated with a memory in accordance with an aspect of the disclosed subject matter.

Referring to FIG. 9, illustrated is a block diagram of an exemplary, non-limiting electronic device 900 that can comprise and/or incorporate the write operation retry system of the present invention or a respective portion(s) thereof. The electronic device 900 can include, but is not limited to, a computer, a laptop computer, network equipment (e.g., routers, access points), a media player and/or recorder (e.g., audio player and/or recorder, video player and/or recorder), a television, a smart card, a phone, a cellular phone, a smart phone, an electronic organizer, a PDA, a portable email reader, a digital camera, an electronic game (e.g., video game), an electronic device associated with digital rights management, a Personal Computer Memory Card International Association (PCMCIA) card, a trusted platform module (TPM), a Hardware Security Module (HSM), a set-top box, a digital video recorder, a gaming console, a navigation system or device (e.g., global position satellite (GPS) system), a secure memory device with computational capabilities, a device with a tamper-resistant chip(s), an electronic device associated with an industrial control system, an embedded computer in a machine (e.g., an airplane, a copier, a motor vehicle, a microwave oven), and the like.

Components of the electronic device 900 can include, but are not limited to, a processor component 902, a system memory 904, which can contain a non-volatile memory 906, and a system bus 908 that can couple various system components including the system memory 904 to the processor component 902. The system bus 908 can be any of several types of bus structures including a memory bus or memory controller, a peripheral bus, or a local bus using any of a variety of bus architectures.

Electronic device 900 can typically include a variety of computer readable media. Computer readable media can be any available media that can be accessed by the electronic device 900. By way of example, and not limitation, computer readable media can comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, non-volatile memory 906 (e.g., flash memory), or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by electronic device 900. Communication media typically embodies computer readable instructions, data structures, program modules or other data in a modulated data signal such as a carrier wave or other transport mechanism and includes any information delivery media.

The system memory 904 can include computer storage media in the form of volatile (e.g., SRAM) and/or non-volatile memory 906 (e.g., flash memory). For example, non-volatile memory 906 can comprise one or more memory components that can be the same or similar, or can contain the same or similar functionality, as memory components as described with regard to system 100, system 200, etc.). A basic input/output system (BIOS), containing the basic routines that can facilitate transferring information between elements within electronic device 900, such as during start-up, can be stored in the system memory 904. The system memory 904 typically also can include data and/or program modules that can be accessible to and/or presently be operated on by the processor component 902. By way of example, and not limitation, the system memory 904 can also include an operating system(s), application programs, other program modules, and program data.

The non-volatile memory 906 can be removable or non-removable. For example, the non-volatile memory 906 can be in the form of a removable memory card or a USB flash drive. In accordance with one aspect, the non-volatile memory 906 can include flash memory (e.g., single-level cell flash memory, multi-level cell flash memory), ROM, PROM, EPROM, EEPROM, or NVRAM (e.g., FeRAM), or a combination thereof, for example. Further, a flash memory can comprise NOR flash memory and/or NAND flash memory. For purposes of the present innovations, the non-volatile memory 906 may store the first non-volatile memory device including the buffer that retains the data after the write operation failure and the second non-volatile memory to which the data may be transferred, according to aspects of the present innovation.

A user can enter commands and information into the electronic device 900 through input devices (not shown) such as a keypad, microphone, tablet, or touch screen although other input devices can also be utilized. These and other input devices can be connected to the processor component 902 through input interface component 910 that can be connected to the system bus 908. Other interface and bus structures, such as a parallel port, game port or a universal serial bus (USB) can also be utilized. A graphics subsystem (not shown) can also be connected to the system bus 908. A display device (not shown) can be also connected to the system bus 908 via an interface, such as output interface component 912, which can in turn communicate with video memory. In addition to a display, the electronic device 900 can also include other peripheral output devices such as speakers (not shown), which can be connected through output interface component 912.

It is to be understood and appreciated that the computer-implemented programs and software can be implemented within a standard computer architecture. While some aspects of the disclosure have been described above in the general context of computer-executable instructions that can be run on one or more computers, those skilled in the art will recognize that the technology also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices (e.g., PDA, phone), microprocessor-based or programmable consumer electronics, and the like, each of which can be operatively coupled to one or more associated devices.

The illustrated aspects of the disclosure may also be practiced in distributed computing environments where certain tasks are performed by remote processing devices that are linked through a communications network. In a distributed computing environment, program modules can be located in both local and remote memory storage devices.

It is also to be understood and appreciated that cryptographic protocols can be employed to facilitate security of data associated with a memory in accordance with the disclosed subject matter. For example, a cryptographic component (e.g., cryptographic engine) can be employed and can facilitate encrypting and/or decrypting data to facilitate securing data being written to, stored in, and/or read from the memory. The cryptographic component can provide symmetric cryptographic tools and accelerators (e.g., Twofish, Blowfish, AES, TDES, IDEA, CAST5, RC4, etc.) to ensure that a specified partition in the memory component, or portions thereof, can only be accessed by those entities authorized and/or authenticated to do so. The cryptographic component can also provide asymmetric cryptographic accelerators and tools (e.g., RSA, Digital Signature Standard (DSS), and the like) to ensure that a specified partition in a memory, or portions thereof, only can be accessed by those entities that are authorized and certified to do so. Additionally, the cryptographic component can provide accelerators and tools (e.g., Secure Hash Algorithm (SHA) and its variants such as, for example, SHA-0, SHA-1, SHA-224, SHA-256, SHA-384, and SHA-512) to ensure that access to the specified partition in the memory is confined to those entities authorized to gain access.

It is to be appreciated and understood that authentication protocols can be employed to facilitate security of data associated with the memory in accordance with the disclosed subject matter. For example, an authentication component can solicit authentication data from an entity, and, upon the authentication data so solicited, can be employed, individually and/or in conjunction with information acquired and ascertained as a result of biometric modalities employed, to facilitate control access to the memory. The authentication data can be in the form of a password (e.g., a sequence of humanly cognizable characters), a pass phrase (e.g., a sequence of alphanumeric characters that can be similar to a typical password but is conventionally of greater length and contains non-humanly cognizable characters in addition to humanly cognizable characters), a pass code (e.g., Personal Identification Number (PIN)), and the like, for example. Additionally and/or alternatively, public key infrastructure (PKI) data can also be employed by the authentication component. PKI arrangements can provide for trusted third parties to vet, and affirm, entity identity through the use of public keys that typically can be certificates issued by the trusted third parties. Such arrangements can enable entities to be authenticated to each other, and to use information in certificates (e.g., public keys) and private keys, session keys, Traffic Encryption Keys (TEKs), cryptographic-system-specific keys, and/or other keys, to encrypt and decrypt messages communicated between entities.

The authentication component can implement one or more machine-implemented techniques to identify an entity by its unique physical and behavioral characteristics and attributes. Biometric modalities that can be employed can include, for example, face recognition wherein measurements of key points on an entity's face can provide a unique pattern that can be associated with the entity, iris recognition that measures from the outer edge towards the pupil the patterns associated with the colored part of the eye—the iris—to detect unique features associated with an entity's iris, and finger print identification that scans the corrugated ridges of skin that are non-continuous and form a pattern that can provide distinguishing features to identify an entity.

As utilized herein, terms "component," "system," "interface," and the like, are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the disclosed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

As such, the present innovation provides methods and systems for write operation retry to be attempted using the data retained in an internal buffer within the non-volatile memory device. By using the data retained in the internal buffer, the systems and method of the present invention eliminate the need to include a dedicated retry buffer at the system level. Thereby, reducing the system cost, minimizing space consumption on a board within the system and, in some instance, limiting the latency attributed to a retry that relies on retrying the write based on re-transferring of the data contents to the internal non-volatile memory buffer.

What has been described above includes examples of aspects of the disclosed subject matter. It is, of course, not possible to describe every conceivable combination of components or methodologies for purposes of describing the disclosed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim.

What is claimed is:

1. A memory system for providing non-volatile write operation retry, comprising:
   a first flash memory configured to receive write data content and attempt to write the write data content to a memory block of a plurality of memory blocks, in response to the attempt being unsuccessful, store the write data content that is associated with a failed write operation to an internal buffer within the first flash memory that is differentiated from the plurality of blocks and, retain the write data content for one or more write operation retries on the internal buffer of the first flash memory; and
   a volatile memory comprising write operation retry logic that is configured to receive notice of the failed write operation from the first flash memory and command a first write operation retry of the one or more write operation retries to the first flash memory by issuing a write operation command to the first flash memory that commands the first flash memory to use the internal buffer of the first flash memory as a source of the write data content for the first write operation retry,
   wherein the write operation retry logic commands the first write operation retry only after a preconfigured sequential series of retry processes are executed, and the write operation retry logic is further configured to execute a first determination as to whether a retry process determining logic is employed to logically execute a second determination as to which one of two or more retry logics for different retry options attempt the first write operation retry based on pre-existing conditions.

2. The memory system of claim 1, wherein the write operation retry logic is further configured to provide a retarget address to the first flash memory, wherein the first flash memory attempts to write the write data content to the retarget address of the first flash memory upon receiving the retarget address and the write operation command.

3. The memory system of claim 1, wherein the write operation retry logic is further configured to transfer the write data content to a different buffer of a second flash memory from the internal buffer of the first flash memory.

4. The memory system of claim 3, wherein the write operation retry logic is further configured to issue a read command to the first flash memory and issue a write command to the second flash memory.

5. The memory system of claim 1, wherein the write operation retry logic is further configured to command a second write operation retry based on the write data content, if the first write operation retry is unsuccessful.

6. The memory system of claim 5, wherein the write operation retry logic is further configured to command the first write operation retry to provide a retarget address to the first flash memory, wherein the first flash memory attempts to write the write data content to the retarget address of the first flash memory in response to the failed write operation and attempts a second write operation retry-operable to transfer the write data content to a different buffer of a second flash memory upon receiving the write operation command and the retarget address when the first write operation retry is unsuccessful.

7. The memory system of claim 5, wherein the write operation logic is further configured to command the first write operation retry to transfer the write data content associated with the failed write operation to a second flash memory in response to the failed write operation to the first flash memory and to command the second write operation retry based on the write data content, if the first write operation retry is unsuccessful, to provide a retarget address to the first flash memory, wherein the first flash memory attempts to write the write data content to the retarget address of the first flash memory.

8. The memory system of claim 1, wherein the write operation logic is further configured to select a write operation retry type from at least one of a first retry type comprising providing a retarget address to the first flash memory, wherein the first flash memory attempts to write the write data content to the retarget address of the first flash memory or a second retry type comprising transferring the write data content to a second flash memory.

9. The memory system of claim 1, wherein the internal buffer comprises a NAND page buffer.

10. A method for retrying a write operation on a flash memory in a computing system, comprising:
    retaining write data content in an internal buffer of a first flash memory after a failed write operation;
    receiving notice of a failed write operation of write data content from the first flash memory; and
    attempting a first write operation retry of the write data content without re-transferring the write data content to the internal buffer of the first flash memory and obtaining the write data content from the internal buffer of the first flash memory that is configured to be a source of the write data content used in the first write operation retry only after a preconfigured sequential series of retry processes are executed; and
    executing a first determination as to whether a retry process determining logic is employed to logically execute a second determination as to which one of two or more retry logics for different retry options attempt the first write operation retry based on pre-existing conditions.

11. The method of claim 10, wherein attempting the first write operation retry further comprises providing a retarget address to the first flash memory and a write operation command, wherein the first flash memory is configured to write the write data content to the retarget address to the first flash memory, upon receiving the retarget address and the write operation command.

12. The method of claim 10, wherein attempting the first write operation retry further comprises transferring the write data content to a different buffer of a second flash memory from the internal buffer of the first flash memory.

13. The method of claim 12, wherein transferring the write data content to the second flash memory further comprises issuing a read command to the first flash memory and issuing a write command to the second flash memory.

14. The method of claim 10, further comprising attempting a second write operation retry based on the write data content, if the first write operation retry is unsuccessful.

15. The method of claim 14, wherein attempting the first write operation retry further comprises providing a retarget address to the first flash memory, wherein the first flash memory attempts to write the write data content to the retarget address and attempting the second write operation retry further comprises transferring the write data content to a different buffer of a second flash memory.

16. The method of claim 14, wherein attempting the first write operation retry further comprises transferring the write data content to a different buffer of a second flash memory and attempting the second write operation retry further comprises providing a retarget address to the first flash memory, wherein the first flash memory attempts to write the write data content to the second flash memory with the retarget address.

17. The method of claim 10, wherein attempting the first write operation retry further comprises logically selecting a write operation retry type from at least one of a first retry type comprising providing a retarget address to the first flash memory, wherein the first flash memory attempts to write the write data content to the retarget address or a second retry type comprising transferring the write data content to a second flash memory.

18. The method of claim 10, further comprising attempting a second write operation retry based on data stored in a system retry buffer, if the first write operation retry is unsuccessful.

19. A method for performing a write operation on a flash memory to facilitate a write operation retry, comprising:
   obtaining write data content associated with a write operation on the flash memory;
   storing the write data content to a page buffer internal to the flash memory;
   attempting to store the write data content to a first address, specified in the write operation, of the flash memory;
   retaining the write data content in the page buffer when the attempt to store the write data content to the first address fails; and
   attempting a write operation retry with the write data content retained in the page buffer after a preconfigured sequential series of retry processes are executed the to store the write data content to the first address fails, and without any re-transferring of the write data content from outside the flash memory to the page buffer; and
   executing a first determination as to whether a retry process determining logic is employed to logically execute a second determination as to which one of two or more retry logics for different retry options attempt the first write operation retry based on pre-existing conditions.

20. The method of claim 19, wherein attempting the write operation retry comprises:
   receiving a retarget address; and
   attempting to store the write data content retained in the page buffer to the retarget address of the flash memory.

21. The memory system of claim 3, wherein the volatile memory further comprises a data transfer protocol that is configured to issue a read command to the buffer of the first flash memory, subsequently issue a write command to the different buffer of the second flash memory, and facilitate transfer of the write data content between the buffer and the different buffer with a temporary storage of the volatile memory.

* * * * *